(12) United States Patent
Boll

(10) Patent No.: US 12,089,533 B2
(45) Date of Patent: Sep. 17, 2024

(54) HARVESTING APPARATUS WITH OVERLOAD PROTECTION DEVICE

(71) Applicant: CLAAS Saulgau GmbH, Bad Saulgau (DE)

(72) Inventor: Ulrich Boll, Bad Salgau (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 907 days.

(21) Appl. No.: 16/923,593

(22) Filed: Jul. 8, 2020

(65) Prior Publication Data

US 2021/0212259 A1     Jul. 15, 2021

(30) Foreign Application Priority Data

Jul. 10, 2019  (DE) .......................... 102019118739.7

(51) Int. Cl.
*A01D 78/14* (2006.01)
*A01D 75/18* (2006.01)

(52) U.S. Cl.
CPC .......... *A01D 78/144* (2013.01); *A01D 75/182* (2013.01); *A01D 75/185* (2013.01); *A01D 78/14* (2013.01); *A01D 78/146* (2013.01)

(58) Field of Classification Search
CPC .... A01D 78/14; A01D 78/144; A01D 78/146; A01D 75/18; A01D 75/182;
(Continued)

(56) References Cited

U.S. PATENT DOCUMENTS 5,566,537 A * 10/1996 Kieffer ................ A01D 75/185
56/15.8
7,310,929 B2 * 12/2007 Dow ...................... A01B 73/02
56/192
(Continued)

FOREIGN PATENT DOCUMENTS

DE    10234741 A1    2/2004
EP     2057888 A2    5/2009
(Continued)

OTHER PUBLICATIONS

Extended European Search Report; dated Dec. 8, 2020; for corresponding EU Application No. 20185127.6; 2 pages.

*Primary Examiner* — Adam J Behrens

(57) ABSTRACT

Harvesting apparatus, with a supporting frame (12) having a longitudinal member and crossmembers, pickup members (20) and transverse conveyor devices (21), wherein a respective pickup member and transverse conveyor device are arranged on a first and second side of the longitudinal member (13), wherein a first shiftable crossmember (14) is shiftable about an axis (24) and is furthermore shiftable via the second crossmember about an axis (25) extending in the longitudinal direction relative to a fixed crossmember (16), and wherein a first overload protection device (26) is positioned between the first and second shiftable crossmembers (14, 15), said overload protection device triggering when a force on the respective pickup member (20) and/or the respective transverse conveyor device (21) and/or the respective first crossmember (14) exceeds a limit value and permitting shifting of the respective pickup member (20) and of the respective transverse conveyor device (21) rearwards about the axis (24).

6 Claims, 2 Drawing Sheets

(58) Field of Classification Search
CPC .. A01D 34/828; A01D 34/664; A01D 34/665; A01D 34/863; A01D 75/185; A01D 78/142
See application file for complete search history.

(56) References Cited

U.S. PATENT DOCUMENTS

| | | | | |
|---|---|---|---|---|
| 8,091,331 | B2* | 1/2012 | Dow | A01B 73/02 56/192 |
| 8,186,138 | B2* | 5/2012 | Dow | A01D 80/005 56/15.8 |
| 8,713,904 | B1* | 5/2014 | Goudy | A01D 34/84 56/15.5 |
| 8,863,489 | B2* | 10/2014 | Landon | A01D 89/002 56/192 |
| 9,038,358 | B2* | 5/2015 | Landon | A01D 84/00 56/192 |
| 10,076,071 | B2* | 9/2018 | Schwer | A01D 84/00 |
| 11,369,059 | B2* | 6/2022 | Hunt | A01D 41/141 |
| 11,632,908 | B2* | 4/2023 | Billard | A01D 34/664 56/228 |
| 2005/0172598 | A1 | 8/2005 | Billard | |
| 2010/0037584 | A1* | 2/2010 | Dow | A01D 80/005 56/376 |
| 2015/0020492 | A1 | 1/2015 | Schwer et al. | |
| 2015/0327428 | A1 | 11/2015 | Landon et al. | |
| 2016/0338259 | A1* | 11/2016 | Schwer | A01B 73/02 |
| 2020/0296889 | A1* | 9/2020 | Billard | A01D 67/00 |
| 2020/0337242 | A1* | 10/2020 | Billard | A01D 34/664 |
| 2024/0025367 | A1* | 1/2024 | Wershing | B60R 21/13 |

FOREIGN PATENT DOCUMENTS

| | | |
|---|---|---|
| EP | 2979529 B1 | 2/2018 |
| EP | 1925198 B1 | 3/2018 |

* cited by examiner

HARVESTING APPARATUS WITH OVERLOAD PROTECTION DEVICE

The invention relates to a harvesting apparatus, namely a merger or a pickup swather.

EP 2 979 529 B1 discloses a harvesting apparatus designed as a merger. Mergers are also referred to as pickup swathers. According to this prior art, the harvesting apparatus designed as a merger has a supporting frame and has a chassis. Furthermore, the harvesting apparatus designed as a merger has pickup members designed as a pickup for picking up harvested crop and transverse conveyor devices designed as belt conveyors for transversely conveying the picked-up harvested crop. The supporting frame has a longitudinal member and has crossmembers, wherein the pickup members and transverse conveying devices are accommodated on the crossmembers. In order to transfer the harvesting apparatus which is known from EP 2 979 529 B1 and is designed as a merger between a working position and a transport position, the pickup members and transverse conveyors are first of all foldable upwards out of their working position about a horizontal axis, wherein the upwardly folded pickup members and transverse conveyor devices are subsequently foldable forwards about a vertical axis.

Whenever, during the harvesting mode, the merger or pickup swather strikes against an obstacle and the obstacle exerts a force on the pickup members and/or the transverse conveyor devices, said force acting counter to the harvesting direction, the merger or pickup swather may be damaged. This is disadvantageous. Avoiding such damage to a merger or pickup swather has caused difficulties to date. There is therefore a requirement for a harvesting apparatus which is designed as a merger or pickup swather and in which the risk of damage in the harvesting mode as a consequence of obstacles against which the harvesting apparatus drives or impacts is reduced.

Taking this as the starting point, the present invention is based on the object of providing a novel harvesting apparatus designed as a merger or pickup swather.

This object is achieved by a harvesting apparatus according to claim 1.

The harvesting apparatus has a supporting frame with a longitudinal member and crossmembers.

The harvesting apparatus has a chassis with wheels.

The harvesting apparatus has pickup members designed as a pickup for picking up harvested crop and transverse conveyor devices designed as belt conveyors for conveying the picked-up harvested crop in a transverse conveying direction running transversely with respect to a longitudinal direction. A respective pickup member and a respective transverse conveyor device are arranged on a first side and on a second side of the longitudinal member.

A first shiftable crossmember which is arranged on the respective side of the longitudinal member and accommodates the respective pickup member and the respective transverse conveyor device is shiftable about an axis extending in a vertical height direction relative to a second shiftable crossmember and is furthermore shiftable via the second shiftable crossmember about an axis extending in the horizontal longitudinal direction relative to a fixed crossmember acting on the longitudinal member.

A respective first overload protection device is positioned between the first and second shiftable crossmembers arranged on the respective side of the longitudinal member, said overload protection device triggering when a force which acts on the respective pickup member and/or the respective transverse conveyor device and/or the respective first crossmember counter to the harvesting direction exceeds a limit value and permitting shifting of the respective pickup member and of the respective transverse conveyor device about the axis extending in a vertical height direction rearwards in the opposite direction to the harvesting direction.

The respective first overload protection device which is arranged on the respective side of the longitudinal member of the supporting frame between the respective first shiftable crossmember of the supporting frame and the respective second shiftable crossmember of the supporting frame enables the pickup member arranged on the respective side and the respective transverse conveyor device to yield rearwards in the opposite direction to the harvesting direction, about the axis extending in a vertical height direction.

If, accordingly, the harvesting apparatus designed as a merger or pickup swather should drive or strike against an obstacle and, as a result, a force acts on the respective pickup member and/or the respective transverse conveyor device and/or the respective first crossmember in the opposite direction to the harvesting direction, said force being greater than the limit value, the respective first overload protection device then triggers and permits the respective pickup member and the respective transverse conveyor device to shift rearwards about the respective axis extending in a vertical direction. This significantly reduces the risk of damage to the pickup members and the transverse conveyor devices of the harvesting apparatus.

According to an advantageous development, whenever the respective first overload protection device triggers and permits shifting of the respective pickup member and of the respective transverse conveyor device about the axis extending in a vertical height direction rearwards in the opposite direction to the harvesting direction, the respective pickup member and the respective transverse conveyor device are automatically also shiftable upwards about the axis extending in a horizontal longitudinal direction. This is particularly preferred in order further to reduce the risk of damage to the pickup members and transverse conveyor devices.

Whenever the respective first overload protection device triggers, the pickup members and the transverse conveyor devices are automatically shiftable upwards, specifically about the respective axis which extends in a horizontal longitudinal direction and is formed between the respective second shiftable crossmember and the respective fixed crossmember.

Preferably, an actuator is positioned between the second shiftable crossmember arranged on the respective side of the longitudinal member and the respective fixed crossmember, said actuator, when the respective first overload protection device triggers, automatically shifting the respective pickup member and the respective transverse conveyor device upwards about the axis extending in a horizontal longitudinal direction. Via the actuator, when the respective first overload protection device is triggered, the respective transverse conveyor device can particularly preferably be shifted upwards together with the respective pickup member.

Preferred developments of the invention emerge from the dependent claims and the description below. Exemplary embodiments of the invention, without being restricted thereto, will be explained in more detail with reference to the drawing, in which:

The invention relates to a harvesting apparatus designed as a merger. Such a harvesting apparatus is also referred to as a pickup swather.

Figure 1:
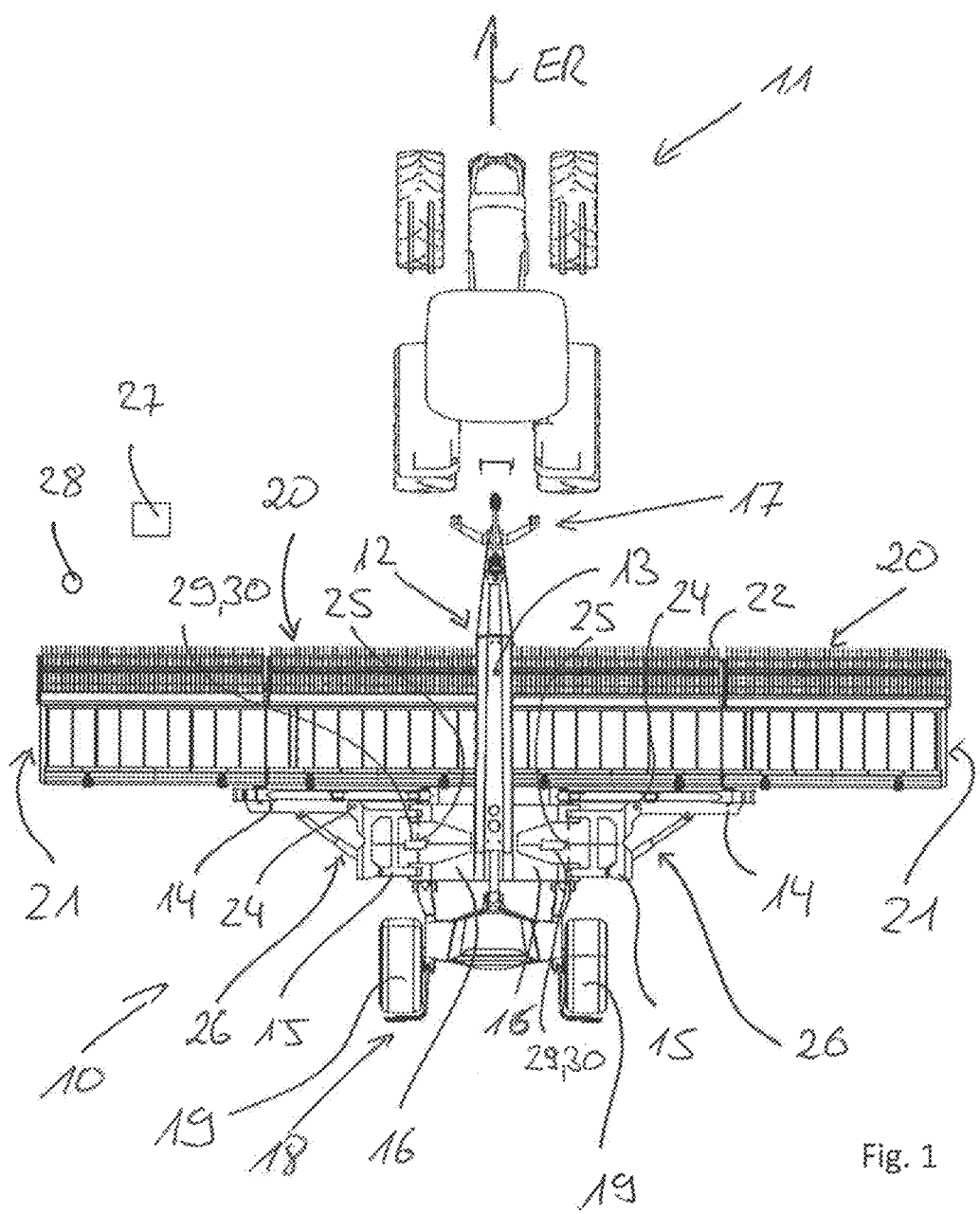
FIG. 1 shows a top view of an arrangement consisting of a tractor and a harvesting apparatus designed as a merger or pickup swather, in a working position.
Figure 2:
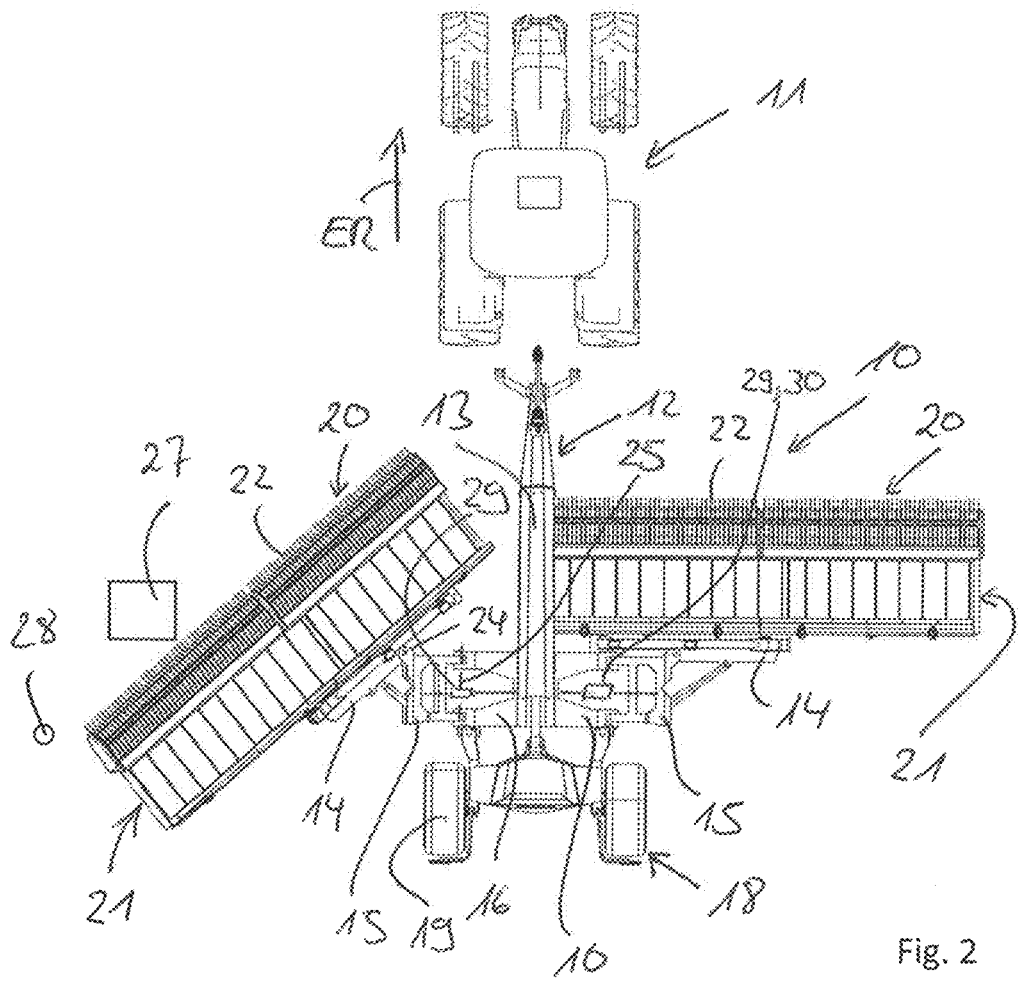
FIG. 2 shows the arrangement of FIG. 1 when running into or driving over an obstacle, in a top view.

FIGS. 1 and 2 show a harvesting apparatus 10 in a working position together with a tractor 11. The harvesting apparatus 10 has a supporting frame 12 with a longitudinal member 13 and crossmembers 14, 15, 16. The harvesting apparatus 10 is couplable to the tractor 11 via the longitudinal member 13, namely via a coupling device 17 formed at the front end of the longitudinal member 13, in order to be pulled by the tractor 11 along an underlying surface to be cultivated. The longitudinal member 13 extends here in the pulling direction or harvesting direction ER.

In the working position of the harvesting apparatus 10, the crossmembers 14, 15, 16 extend transversely or perpendicularly with respect to the longitudinal member 13 and therefore with respect to the harvesting direction ER.

The harvesting apparatus 10 furthermore has a chassis 18 with wheels 19. The chassis 18 is also referred to as the main chassis. Both in the working position and in a transport position, the harvesting apparatus 10 designed as a merger is supported on an underlying surface to be cultivated or to be driven over via the wheels 19 of the chassis 18.

The harvesting apparatus 10 furthermore has pickup members 20 and transverse conveyor devices 21.

The pickup members 20 are designed as what is referred to as a pickup and serve for picking up harvested crop from the underlying surface to be cultivated. On a first side of the longitudinal member 13, a first pickup member 20 is accommodated on a respective first crossmember 14. On a second side of the longitudinal member 13, a second pickup member 20 is accommodated on the respective first crossmember 14. The pickup members 20 have pickup tines 22 which are driven about an axis extending in the transverse direction in order to pick up the harvested crop from the ground. In the working position of the harvesting apparatus 10, each of the pickup members 20 is supported via feeler wheels 23 on the underlying surface to be cultivated.

As already explained, the harvesting apparatus 10 has the transverse conveyor devices 21 in addition to the pickup members 20. The transverse conveyor devices 21 are designed as belt conveyors, wherein the transverse conveyor devices 21 can be used to transport the harvested crop picked up via the pickup members 20 from the underlying surface to be cultivated in a transverse conveying direction extending transversely or perpendicularly with respect to the longitudinal direction. On the first side of the longitudinal member 13, a first transverse conveyor device 21 is accommodated together with the respective pickup device 20 on the respective first crossmember 14. On the second side of the longitudinal member 13, a second transverse conveyor device 21 is accommodated together with the respective pickup device 20 on the respective first crossmember 14.

As can be gathered from the drawings, the transverse conveyor devices 21 are arranged downstream of the pickup members 20, as seen in the harvesting direction ER.

The first crossmembers 14 on which the pickup members 20 and the transverse conveyor devices 21 are accommodated are shiftable about a respective axis 24 extending in a vertical height direction relative to a second crossmember 15. The second crossmembers 15, for their part, are each shiftable about an axis 25 extending in a horizontal longitudinal direction with respect to a third crossmember 16. The third crossmembers 16 engage fixedly on the longitudinal member 13.

Accordingly, a respective pickup member 20 and a respective transverse conveyor device 21 are arranged on each side of the longitudinal member 13.

The first shiftable crossmember 14 arranged on a respective side of the longitudinal member 13 accommodates the respective pickup member 20 and the respective transverse conveyor device 21.

Said first shiftable crossmember 14 accommodating the respective pickup member 20 and the respective transverse conveyor device 21 is shiftable about the respective axis 24 extending in a vertical height direction relative to the respective second shiftable crossmember 15, namely is pivotable or foldable rearwards.

Furthermore, the respective first shiftable crossmember 14 is shiftable via the respective second shiftable crossmember 15 about the axis 25 extending in a horizontal longitudinal direction relative to the respective fixed crossmember 16 which engages non-shiftably on the longitudinal member 13. Said shifting capability about the axis 25 extending in a horizontal longitudinal direction corresponds to a folding movement of the respective pickup member 20 and of the respective transverse conveyor device 21 upwards.

In the case of the harvesting apparatus 10 according to the invention, a respective first overload protection device 26 is positioned between the first and second shiftable crossmembers 14 and 15 arranged on the respective side of the longitudinal member 13.

Said respective first overload protection device 26 of the harvesting apparatus designed as a merger or pickup swather triggers whenever a force which acts on the respective pickup member 20 and/or the respective transverse conveyor device 21 and/or the respective first crossmember 14 counter to the harvesting direction ER is greater than a predetermined limit value.

The triggered first overload protection device 26 then permits shifting of the respective pickup member 20 and of the respective transverse conveyor device 21 together with the respective first shiftable crossmember 14 about the axis 24 extending in a vertical height direction rearwards in the opposite direction to the harvesting direction.

Figure 3:
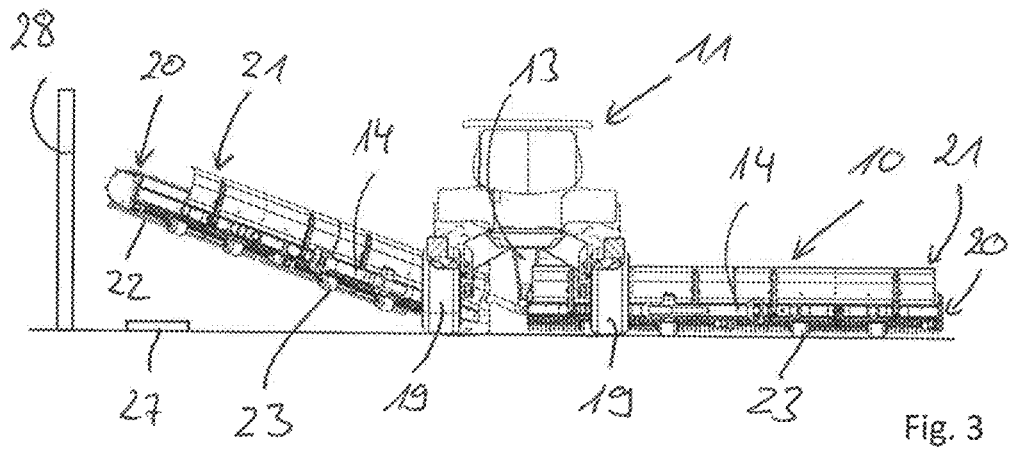
FIG. 3 shows the arrangement of FIGS. 1 and 2 when running into or driving over an obstacle, in a rear view.

If, therefore, in the harvesting mode, the harvesting apparatus 10 drives against an obstacle and/or is pulled against an obstacle and said obstacle exerts an impermissibly high force on the respective pickup member 20 and/or the respective transverse conveyor device 21 and/or the respective first crossmember 14 counter to the harvesting direction, the respective first overload protection device 26 triggers and permits the automatic shifting of the respective pickup member 20 and of the respective transverse conveyor device 21 together with the respective first shiftable crossmember 14 out of the working position shown in FIG. 1 rearwards counter to the harvesting direction ER, as is shown in FIG. 2 for the pickup member 20 positioned on the left side of the longitudinal member 13 and for the corresponding transverse conveyor device 21. FIGS. 1 to 3 show possible obstacles 27, 28 which protrude to different heights in the vertical direction in relation to the underlying surface to be cultivated.

In the exemplary embodiment shown, the respective first overload protection device 26 is over an overload protection cylinder which automatically triggers or opens whenever the pressure acting in the cylinder exceeds a limit value.

Alternatively, the respective first overload protection device 26 may also be an overload protection strut which yields mechanically along a predetermined breaking point.

According to a particularly advantageous development of the invention, it is provided that, whenever the respective first overload protection device 26 triggers and permits shifting of the respective pickup member 20 and of the respective transverse conveyor device 21 together with the respective first shiftable crossmember 14 rearwards about the axis 24 extending in a vertical height direction, the respective pickup member 20 and the respective transverse conveyor device 21 together with the respective first shiftable crossmember 14 are also automatically shiftable upwards about the axis 25 extending in a horizontal longitudinal direction. In this case, the respective pickup member 20 is then automatically shifted upwards together with the respective transverse conveyor device 21 whenever a force acting on the respective pickup member 20 and/or the respective transverse conveyor device 21 and/or the respective crossmember 14 counter to the harvesting direction is greater than a limit value.

For this purpose, it is then provided in particular that an actuator 29 is arranged between the second shiftable crossmember 15, which is arranged on the respective side of the longitudinal member 13, and the respective fixed crossmember 16, via which actuator the respective second shiftable crossmember 15 is shiftable upwards upwards about the axis 25 extending in the horizontal longitudinal direction relative to the respective fixed crossmember 16, and therefore so too is the respective first shiftable crossmember 14 together with the pickup member 20 accommodated thereon and with the respective transverse conveyor device 21.

Said actuator 29 is preferably an actuating cylinder, such as a hydraulic actuating cylinder.

Provision may be made to integrate a second overload protection device 30 in said actuator 29, which second overload protection device triggers whenever a force which acts on the respective pickup member 20 and/or the respective transverse conveyor device 21 and/or the respective first or second crossmember 14, 15 in the vertical direction is greater than a limit value and then permits shifting of the respective pickup member 20 and of the respective transverse conveyor device 21 upwards about the axis 25 extending in a horizontal longitudinal direction.

The invention makes it possible to prevent a harvesting apparatus designed as a merger or pickup swather being damaged upon contact with an obstacle protruding in relation to an underlying surface to be cultivated and a force exerted by said obstacle on a pickup member and/or a transverse conveyor device and/or a crossmember accommodating the pickup member and the transverse conveyor device.

It is self-evident that the respective first overload protection device 26 can be triggered only if the force acting in the opposite direction to the harvesting direction ER acts on the respective pickup member 20 and/or the respective transverse conveyor device 21 and/or the crossmember 14 accommodating said assemblies in a response region lying between the respective vertical axis 24 and the respective lateral end of the harvesting apparatus.

LIST OF REFERENCE SIGNS 10 harvesting apparatus
11 tractor
12 supporting frame
13 longitudinal member
14 crossmember
15 crossmember
16 crossmember
17 coupling device
18 chassis
19 wheel
20 pickup members
21 transverse conveyor device
22 pickup tines
23 feeler wheel
24 axis
25 axis
26 overload protection device
27 obstacle
28 obstacle
29 actuator
30 overload protection device

The invention claimed is:

1. A harvesting apparatus (10), namely merger or pickup swather, the harvesting apparatus comprising:
   a supporting frame (12) having a longitudinal member (13) and crossmembers (14, 15, 16),
   a chassis (18) having wheels (19),
   pickup members (20) designed as a pickup for picking up harvested crop, and with transverse conveyor devices (21) designed as belt conveyors for conveying the picked-up harvested crop in a transverse conveying direction running transversely with respect to a longitudinal direction,
   wherein a respective pickup member (20) and a respective transverse conveyor device (21) are arranged on a first side and on a second side of the longitudinal member (13),
   wherein a first shiftable crossmember (14) which is arranged on the respective side of the longitudinal member (13) and accommodates the respective pickup member (20) and the respective transverse conveyor device (21) is shiftable about an axis (24) extending in a vertical height direction relative to a second shiftable crossmember (15) and is furthermore shiftable via the second shiftable crossmember (15) about an axis (25) extending in the horizontal longitudinal direction relative to a fixed crossmember (16) acting on the longitudinal member (13),
   wherein a respective first overload protection device (26) is positioned between the first and second shiftable crossmembers (14, 15) arranged on the respective side of the longitudinal member (13), the respective first overload protection device triggering when a force which acts on the respective pickup member (20) and/or the respective transverse conveyor device (21) and/or the respective first crossmember (14) in a horizontal direction counter to the harvesting direction exceeds a limit value and permitting shifting of the respective pickup member (20) and of the respective transverse conveyor device (21) about the axis (24) rearwards in the opposite direction to the harvesting direction, and
   wherein a respective second overload protection device (30) is positioned between the second shiftable crossmembers (15) arranged on the respective side of the longitudinal member (13) and the respective fixed crossmember (16), the second overload protection device triggering when a force which acts on the respective pickup member (20) and/or the respective transverse conveyor device (21) and/or the respective first and/or second crossmember (14, 15) in the vertical direction exceeds a limit value and permitting shifting of the respective pickup member (20) and of the respective transverse conveyor device (21) upwards about the axis (25) extending in a horizontal longitudinal direction.

2. A harvesting apparatus according to claim 1, characterized in that the respective first overload protection device (26) is an overload protection strut or an overload protection cylinder.

3. A harvesting apparatus according to claim 1, characterized in that the respective second overload protection device (30) is an overload protection strut or an overload protection cylinder.

4. A harvesting apparatus according to claim 1, characterized in that when the respective first overload protection device (26) triggers and permits shifting of the respective pickup member (20) and of the respective transverse conveyor device (21) about the axis (24) rearwards in the opposite direction to the harvesting direction, the respective pickup member (20) and the respective transverse conveyor device (21) are automatically also shiftable upwards about the axis (25) extending in a horizontal longitudinal direction.

5. A harvesting apparatus according to claim 4, characterized in that an actuator (29) is positioned between the second shiftable crossmember (15) arranged on the respective side of the longitudinal member (13) and the respective fixed crossmember (16), the actuator, when the respective first overload protection device (26) triggers, automatically shifting the respective pickup member (20) and the respective transverse conveyor device (21) upwards about the axis (25) extending in a horizontal longitudinal direction.

6. A harvesting apparatus according to claim 5, characterized in that the respective actuator (29) is an actuating cylinder.

* * * * *